United States Patent
Tolliver et al.

(10) Patent No.: US 7,852,082 B2
(45) Date of Patent: Dec. 14, 2010

(54) REMOTE MONITORING SYSTEM AND METHOD

(75) Inventors: Todd Ryan Tolliver, Clifton Park, NY (US); Joseph Alfred Iannotti, Glenville, NY (US); Glen Peter Koste, Niskayuna, NY (US); Selaka Bandara Bulumulla, Niskayuna, NY (US); Richard Louis Frey, Dalanson, NY (US)

(73) Assignee: General Electric Company, Niskayuna, NY (US)

( * ) Notice: Subject to any disclaimer, the term of this patent is extended or adjusted under 35 U.S.C. 154(b) by 212 days.

(21) Appl. No.: 12/177,484

(22) Filed: Jul. 22, 2008

(65) Prior Publication Data

US 2008/0281185 A1    Nov. 13, 2008

Related U.S. Application Data

(62) Division of application No. 11/093,310, filed on Mar. 29, 2005, now abandoned.

(51) Int. Cl.
*G01V 3/00* (2006.01)
(52) U.S. Cl. ...................... 324/318; 324/309
(58) Field of Classification Search ......... 324/300–322; 600/407–445
See application file for complete search history.

(56) References Cited

U.S. PATENT DOCUMENTS

| | | | |
|---|---|---|---|
| 5,003,624 A | 3/1991 | Terbrack et al. | |
| 5,031,235 A | 7/1991 | Raskin et al. | |
| 5,170,274 A | 12/1992 | Kuwata et al. | |
| 5,208,817 A | 5/1993 | Kao et al. | |
| 5,317,443 A | 5/1994 | Nishimoto | |
| 5,440,113 A | 8/1995 | Morin et al. | |
| 5,477,858 A * | 12/1995 | Norris et al. | 600/441 |
| 5,566,263 A | 10/1996 | Smith et al. | |
| 5,742,268 A | 4/1998 | Noda | |
| 5,805,321 A | 9/1998 | Ooi et al. | |
| RE36,088 E | 2/1999 | Kuwata et al. | |
| 5,963,352 A | 10/1999 | Atlas et al. | |
| 6,052,614 A * | 4/2000 | Morris et al. | 600/509 |
| 6,100,687 A * | 8/2000 | Weitekamp et al. | 324/300 |
| 6,341,031 B1 | 1/2002 | McBrien et al. | |
| 6,374,000 B1 | 4/2002 | Olesen | |

(Continued)

FOREIGN PATENT DOCUMENTS

EP    1056228    11/2000

(Continued)

*Primary Examiner*—Brij B Shrivastav
(74) *Attorney, Agent, or Firm*—Ann M. Agosti

(57) ABSTRACT

A remote control system for a modulatable device is provided. The remote control system comprises a receiver system coupled to the modulatable device and configured to obtain an output characteristic of the modulatable device, the receiver system being located remotely with respect to the modulatable device. The system further comprises a command signal setting system coupled to the receiver system and configured to use the output characteristic to generate a drive command signal and a bias system coupled to the command signal setting system and configured to receive the drive command signal and set a bias point of the modulatable device based on the drive command signal. The bias system is located locally with respect to the modulatable device. The command signal setting system and the bias system are coupled via a first optical conduit.

24 Claims, 3 Drawing Sheets

U.S. PATENT DOCUMENTS

| | | | |
|---|---|---|---|
| 6,392,779 B1 | 5/2002 | Iannelli et al. | |
| 6,700,907 B2 | 3/2004 | Schneider et al. | |
| 7,200,343 B2 * | 4/2007 | Ikeuchi | 398/198 |
| 7,231,254 B2 * | 6/2007 | DiLorenzo | 607/45 |
| 7,403,008 B2 * | 7/2008 | Blank et al. | 324/316 |
| 7,451,004 B2 * | 11/2008 | Thiele et al. | 700/28 |
| 7,573,264 B2 * | 8/2009 | Xu et al. | 324/304 |
| 7,639,849 B2 * | 12/2009 | Kimpe et al. | 382/128 |
| 2002/0001115 A1 | 1/2002 | Ishida et al. | |
| 2002/0001116 A1 | 1/2002 | Kajiya et al. | |
| 2002/0003648 A1 | 1/2002 | Kobayashi et al. | |
| 2002/0015212 A1 | 2/2002 | Fujiwara et al. | |
| 2006/0116634 A1 * | 6/2006 | Shachar | 604/95.01 |
| 2009/0024038 A1 * | 1/2009 | Arnold | 600/459 |
| 2010/0081860 A1 * | 4/2010 | Leuthardt et al. | 600/27 |

FOREIGN PATENT DOCUMENTS

| | | |
|---|---|---|
| EP | 1130817 | 9/2001 |
| EP | 1182807 | 2/2002 |
| JP | 08201742 | 8/1996 |

* cited by examiner

REMOTE MONITORING SYSTEM AND METHOD

CROSS REFERENCE TO RELATED APPLICATIONS

This application is a Division of application Ser. No. 11/093,310 filed Mar. 29, 2005, now abandoned which is herein incorporated by reference.

BACKGROUND

The invention relates generally to modulatable devices and more specifically to a method and a system for remotely setting a bias point of the modulator.

External modulation of a continuous wave source using an optical modulator such as a Mach Zehnder modulator is a widely used method in analog optical links. Optical modulators typically have a nonlinear transfer function for the conversion of electrical modulation into optical modulation. In order to maintain a link with low distortion, the modulator is biased at a certain point in the transfer function, typically known as the bias point.

The optimal bias point may drift over time, for various reasons such as aging of the modulator, temperature, and other material related phenomena. To maintain the optimal bias point, this drift must be tracked and then the applied bias adjusted to reflect the new state of the transfer function. This requires some amount of external control electronics to process information from the modulator. In some applications, such as magnetic resonance imaging (MRI), where it may be desirable to place the modulator at the receive coils, there is limited space, limited electrical power and the environment may be harmful to electronics due to interference effects.

In addition, in MRI applications, the modulator bias is required to be set before each scan of a patient. When the bias is set, the scanning may be done within a time frame where the bias remains at the optimum level. Other applications may be in remote sensing, where a low distortion link is required, but only for a duration that is sufficiently short so that the bias does not drift from its optimum value during the time it is in operation.

Typically, the bias point control has been addressed by use of a pilot tone. The pilot tone is mixed with the modulation signal and the bias point is adjusted through a control loop that uses harmonics of the pilot tone or phase differentials of the pilot tone. However, mixing a pilot tone with the modulation signal can introduce distortion to the modulation signal, limiting the dynamic range of the link. In addition, a stable and accurate local clock source is required to generate the pilot tone, which may not always be available.

Therefore, there is a need to remotely monitor and control the bias of a modulatable device used in applications where minimum distortion and high dynamic range is desired.

BRIEF DESCRIPTION

Briefly in accordance with one aspect of the invention, a remote control system for a modulatable device is provided. The remote control system comprises a receiver system coupled to the modulatable device and configured to obtain an output characteristic of the modulatable device, the receiver system being located remotely with respect to the modulatable device. The remote control system further comprises a command signal setting system coupled to the receiver system and configured to use the output characteristic to generate a drive command signal. In addition, the remote control system further comprises a bias system coupled to the command signal setting system and configured to receive the drive command signal and set a bias point of the modulatable device based on the drive command signal. The bias system is located locally with respect to the modulatable device, and the command signal setting system and the bias system are coupled via a first optical conduit.

In another embodiment, a magnetic resonance (MR) system including a remote control system for a modulatable device is provided. The magnetic resonance system comprises a modulatable device located within a magnetic field of the magnetic resonance system and configured to provide an output characteristic of the modulatable device to an output characteristic receive and command signal setting assembly situated outside the magnetic field. The system further comprises a bias system optically coupled to the output characteristic receive and command signal setting assembly and coupled to the modulatable device. The bias system is configured to receive a drive command signal from the output characteristic receive and command signal setting assembly and to set a bias point of the modulatable device based on the drive command signal.

In another embodiment, a method of remote control for a modulatable device is provided. The method comprises remotely obtaining an output characteristic of the modulatable device, the receiver system being located remotely with respect to the modulatable device. The method further comprises using the output characteristic to generate a drive command signal and locally obtaining the drive command signal and setting a bias point of the modulatable device based on the drive command signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
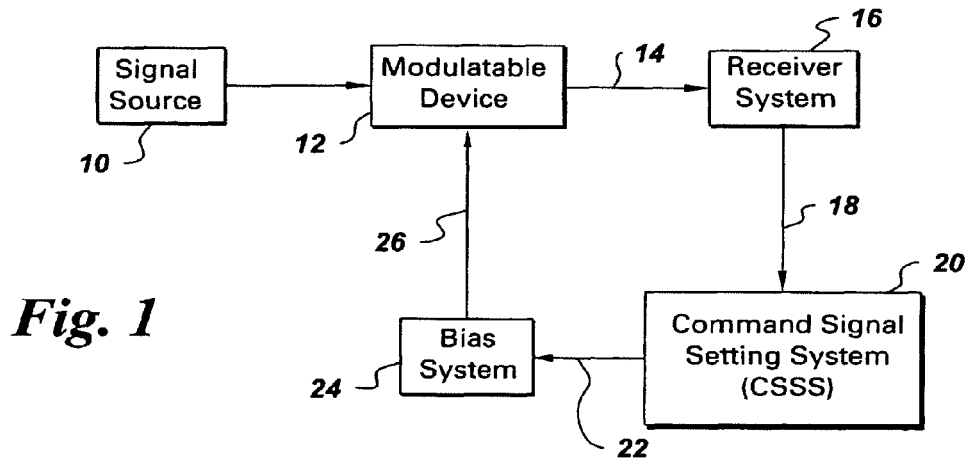
FIG. 1 is a block diagram illustrating one embodiment of a remote monitoring system implemented according to one aspect of the invention.

FIG. 1 is a block diagram illustrating one embodiment of the invention implemented to remotely set a bias point of a modulatable device. FIG. 1 illustrates a modulatable device 12, a receiver system 16, a command signal setting system 20 and a bias system 24. Each component is described in further detail below.

As used herein, "adapted to", "configured" and the like refer to devices in a system to allow the elements of the system to cooperate to provide a described effect; these terms also refer to operation capabilities of electrical or optical elements such as analog or digital computers or application specific devices (such as an application specific integrated circuit (ASIC)), amplifiers or the like that are programmed to provide an output in response to given input signals, and to mechanical devices for optically or electrically coupling components together.

Modulatable device 12 receives signals from signal source 10 as shown in FIG. 1. A modulatable device in general may be defined as a device that modulates a carrier signal with a modulation signal for transmission over a network. A modulatable device has a bias point which when adjusted enables the generation of a high quality modulated signal. One example of a carrier signal source is a constant power laser source used in an analog optical transmission system. It may be noted that modulatable device may include one or more modulatable devices.

The modulatable device modulates the signals as required and generates a modulated output signal. Examples of modulatable devices include optical modulators, RF modulators, and laser diodes. In a more specific embodiment, the modulatable device is a Mach-Zehnder modulator.

Receiver system 16 is coupled to the modulatable device and configured to obtain an output characteristic from the modulated output signal generated by the modulatable device. The output characteristic may be an output power, spectral content, voltage or current.

It may be noted that the receiver system is located remotely with respect to the modulatable device. For example the modulatable device when used in an MRI system is situated in a shielded room and the receiver system is situated outside the shielded room, such as, for example in a console room, or in an unshielded portion of the room in which the MRI system is situated. In one embodiment, the receiver system is an optical receiver system.

Command signal setting (CSS) system is coupled to the receiver system via line 18 and configured to use the output characteristic to generate a drive command signal. Line 18 may be an optical conduit or an electrical wire. The manner in which the command signal setting system may generate the drive command signal is described in more detail with reference to FIG. 2.

Continuing with FIG. 1, bias system 24 is coupled to the command signal setting system and is configured to receive the drive command signal and set a bias point of the modulatable device based on the drive command signal. It may be noted that the bias system is typically located locally with respect to the modulatable device. The drive command signal is converted to a voltage or current proportionate to the intensity of the drive command signal and the voltage or current is applied to the modulatable device via line 26. Line 26 may be an optical conduit or an electrical wire. In one specific embodiment, the bias system is implemented using a photodiode and a resistor.

In one embodiment, the command signal setting system and the bias system are coupled via a first optical conduit 22. In a more specific embodiment, the receiver system 16 is coupled to the modulatable device using a second optical conduit 14. The optical conduit may comprise either a single fiber or multiple fibers. It may be noted that the receiver system may be coupled to the modulatable device using an electrical wire. The signals may also be transmitted using wireless signal transmission.

As described earlier, the command signal setting system 20 is configured to generate the drive command signal, which in turn is used to set the bias point of the modulatable device. The drive command signal may be based on a desired factor with some examples including device life time, distortion reduction, noise reduction, and signal path gain.

In one embodiment, the command signal setting system is configured to generate the drive command signal by mapping a transfer function and obtaining an optimum bias point for the drive command signal. In a more specific embodiment, the transfer function is traced to generate the drive command signal by measuring an output power of the modulatable device as shown in the flow chart of FIG. 2. Thus, the output characteristic in such an embodiment is the output power. Each step is described in further detail below.

In step 30, an initial output power of the modulatable device is measured based on an initial drive current $I_0$. In step 32, the initial drive current is increased until the output power of the modulatable device is at a maximum. The drive current Imax corresponding to the maximum output power is calculated.

In step 34, the initial drive current is decreased until the output power of the modulatable device is at a minimum. The drive current Imin corresponding to the minimum output power is determined. In step 36, an average of the minimum drive current Imin and the maximum drive current Imax is calculated. In step 38, the drive current is generated based on the average calculated in step 36.

Figure 2:
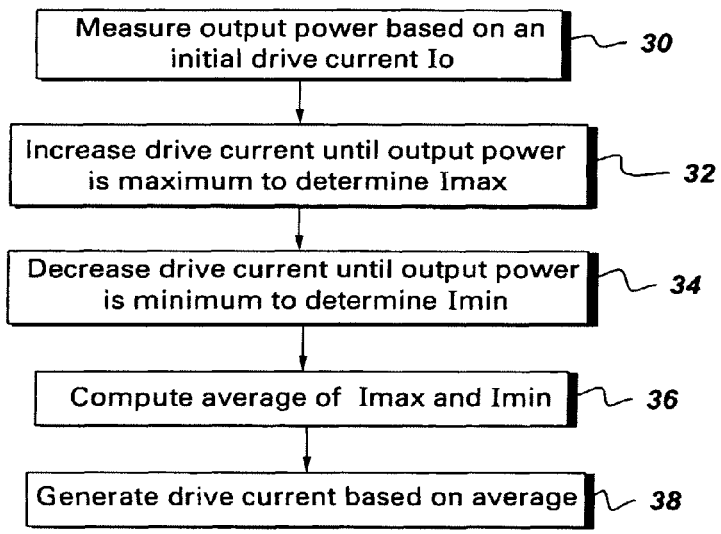
FIG. 2 is a flow chart illustrating one method by which a transfer function of a modulatable device is traced.
Figure 3:
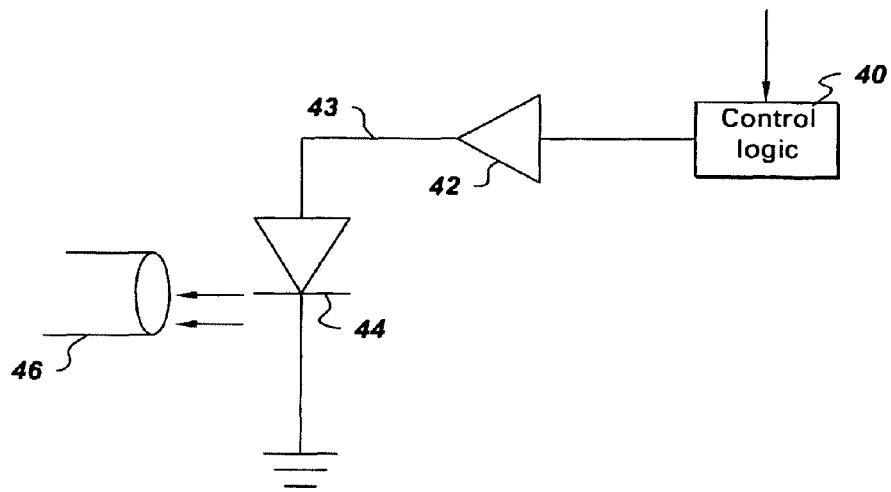
FIG. 3 is a block diagram of one embodiment of a command signal setting device.

FIG. 3 illustrates a block diagram of one embodiment of a command signal setting device used to implement the steps of FIG. 2. The command signal setting system comprises control logic unit 40, an optical source 44, a driver for the optical source 42 and a fiber 46. The control logic unit executes the steps of the algorithm given in FIG. 2. Examples of the control logic unit include micro-controllers, microprocessors or other software programmable devices within systems such as magnetic resonance imaging systems or a hardware circuit. The output of the control logic unit proportionately varies the intensity of light of source 44 by generating a drive current 43 through the driver 42. The light source may be a light emitting diode or a laser source, for example. The light is coupled to the fiber 46, which is an example of optical conduit 22 in FIG. 1.

In another embodiment, the command signal setting system is configured to generate the drive command signal based on signal distortion or spectral content. In a more specific embodiment, the command signal setting system is configured to generate the drive command signal based on minimization of second order harmonic components.

One advantage of using the second harmonic components is that a drift of the bias point of a Mach Zehnder modulator can be tracked by monitoring the second harmonic components. For example, if the second harmonic component increases, it can be assumed that the bias point has drifted. The bias point can be then be adjusted to achieve optimum setting again. Such an adjustment can be made even during the operation of the system in which the remote monitoring system is implemented is operational.

In a specific embodiment where the drive command signal is determined by monitoring distortion, the receiver system includes a bandpass filter. The optimum bias point results in a minimum second harmonic distortion at the output of a band pass filter. The drive command signal is generated by measuring the output of the bandpass filter for an initial drive current and increasing the drive current until the output at the bandpass filter is minimum. The corresponding drive current or voltage is set as the drive command signal and is maintained during an operation sequence.

Figure 4:
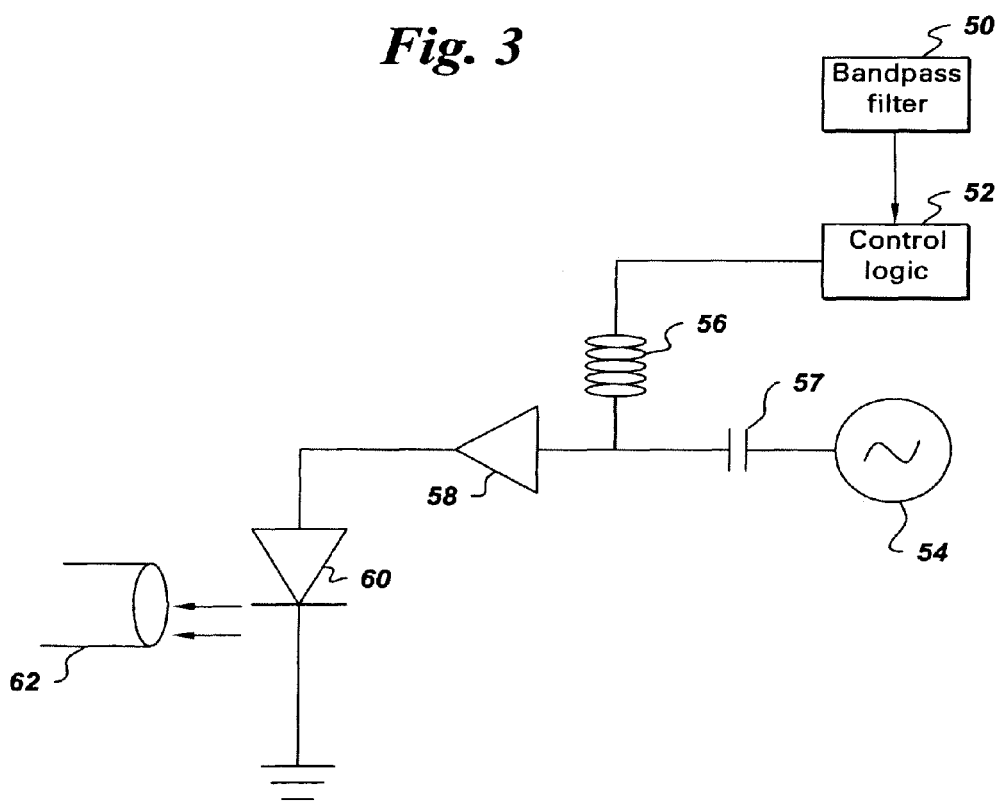
FIG. 4 is a block diagram of another embodiment of a command signal setting device.

In a another embodiment where the drive command signal is determined by monitoring distortion, the command signal setting system comprises a band pass filter and a pilot tone generator as shown in FIG. 4. The command signal setting system comprises band-pass filter 50, a control logic unit 52 a pilot tone generator 54, a coupling mechanism 56, a driver 58, a light source 60 and a fiber 62. Fiber 62 is an example of optical conduit 22 in FIG. 1.

The band pass filter response is centered on the second harmonic frequency of the pilot tone signal. The output of the band-pass filter indicates the strength of the second harmonic. The control logic unit uses the output from band-pass filter to increase or decrease a dc voltage into the coupling mechanism. Examples of the pilot tone generator include a crystal oscillator or other frequency stable clock sources.

The pilot tone is combined to the output of the control logic unit through the coupling mechanism. The coupling is usually implemented through the use of a bias-t, which comprises of an inductor 56 and capacitor 57. The combined output of the coupling mechanism then drives the light source.

The command signal setting (CSS) system is configured to generate a drive command signal corresponding to a minimum output signal of the band pass filter. In the embodiments where the modulatable device is used in an MRI system, the pilot tone is generated during a pre-scan mode of a magnetic resonance system or during a scan mode of the magnetic resonance imaging system.

Figure 5:
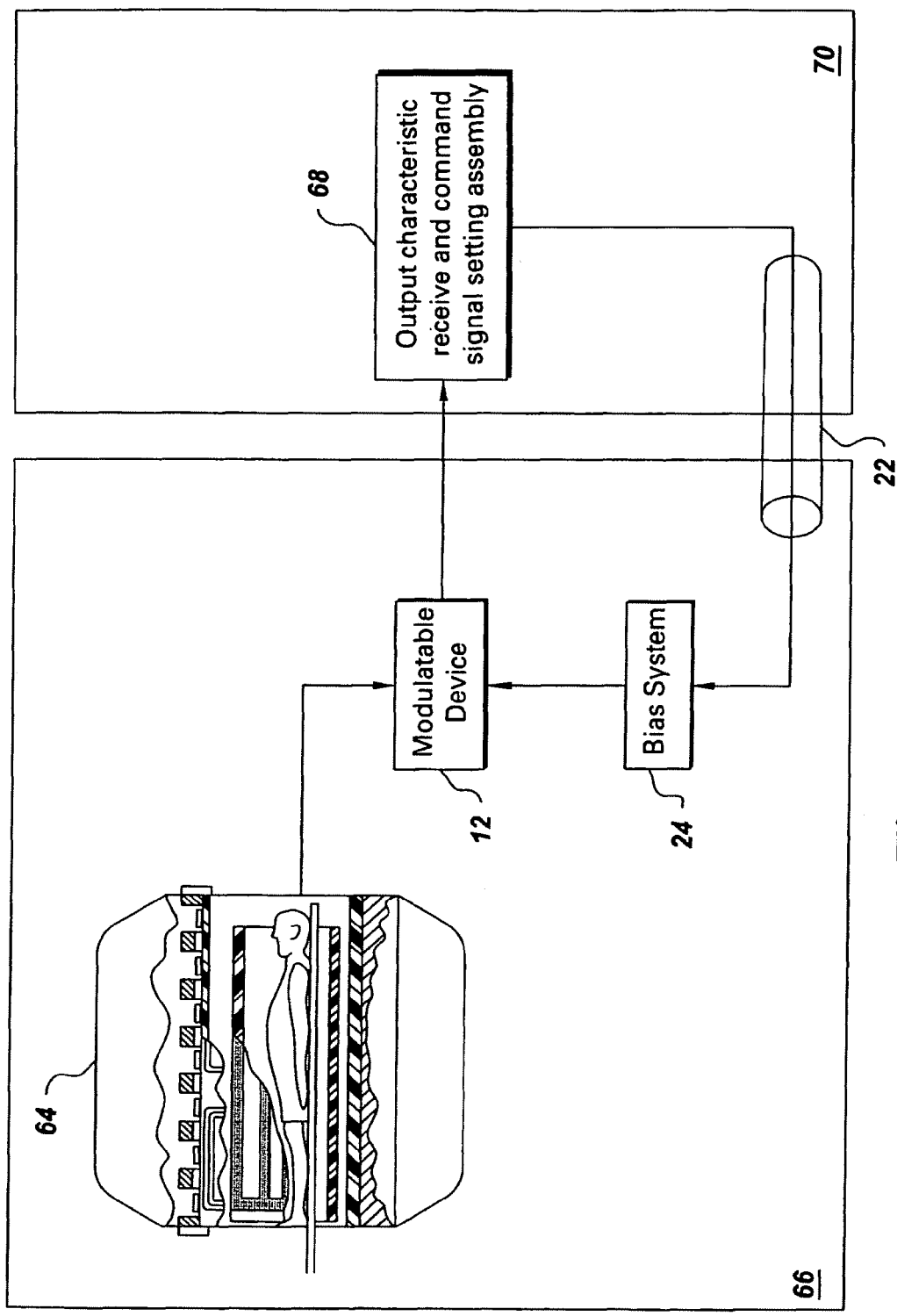
FIG. 5 is a block diagram of an embodiment of a magnetic resonance imaging system implemented according to one aspect of the invention.

The remote sensing system described above may be implemented in various systems. An example system where the remote sensing system is implemented is a magnetic resonance imaging system as described in detail below. FIG. 5 is a block diagram of a magnetic resonance imaging system employing one embodiment of a remote sensing system. Each component is described in further detail below.

Magnetic assembly 64 comprises radio frequency coils and gradient coils that are used to induce an electromagnetic field around an object in order to generate images. In order to generate magnetic resonance signals that are representative of regions of the object, electrical devices such as amplifiers (not shown) and modulatable device 12 are used. The magnetic assembly 64 and the modulatable device 12 are located within a shielded environment 66.

Modulatable device 12 is configured to provide an output characteristic of the modulatable device to an output characteristic receives and command signal setting assembly 68 situated in a control room or area 70. Control room 70 is located outside the magnetic field. In one embodiment, the output characteristic receive and command signal setting assembly 68 comprises receiver system 16 and command signal setting (CSS) system 20 as described with reference to FIG. 1. The receiver system and the CSS system may be separate systems coupled together or may be one integral system.

Bias system 24 is optically coupled to the output characteristic receive and command signal setting assembly using optical conduit 22 and is also coupled to the modulatable device. The bias system is located within or outside the magnetic field. In one embodiment, the modulatable device is coupled to output characteristic receive and command signal setting assembly via an optical conduit.

The bias system is configured to receive a drive command signal from the output characteristic receive and command signal setting assembly and to set a bias point of the modulatable device based on the drive command signal. The drive command signal may be generated using any one of the techniques described with reference to FIG. 2, FIG. 3 and FIG. 4.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A magnetic resonance (MR) system including a remote control system for a modulatable device, the magnetic resonance system comprising:
   a modulatable device located within a magnetic field of the magnetic resonance system and configured to provide an output characteristic of the modulatable device to an output characteristic receive and command signal setting assembly situated outside the magnetic field;
   a bias system optically coupled to the output characteristic receive and command signal setting assembly and coupled to the modulatable device, the bias system configured to receive a drive command signal from the output characteristic receive and command signal setting assembly and to set a bias point of the modulatable device based on the drive command signal;
   wherein the output characteristic comprises an output power and wherein the output characteristic receive and command signal setting assembly is configured to generate the drive command signal based on a maximum output power and a minimum output power generated by the modulatable device.

2. The MR system of claim 1, wherein the modulatable device is coupled to output characteristic receive and command signal setting assembly via an optical conduit.

3. The MR system of claim 1, wherein the modulatable device comprises a device selected from the group consisting of optical modulators, RF modulators, and laser diodes.

4. The MR system of claim 1, wherein the bias system is located within the magnetic field.

5. The MR system of claim 1, wherein the output characteristic receive and command signal setting assembly is configured to generate the drive command signal by mapping a transfer function and obtaining an optimum position for the drive command signal.

6. The MR system of claim 5, wherein the modulatable device comprises an optical modulator.

7. The MR system of claim 1, wherein the output characteristic receive and command signal setting assembly is configured to generate the drive command signal by taking an average of a first drive signal corresponding to the maximum output power and a second drive signal corresponding to the minimum output power.

8. The MR system of claim 1, wherein the output characteristic receive and command signal setting assembly is configured to generate the drive command signal based on output characteristic signal distortion.

9. The MR system of claim 8, wherein the output characteristic receive and command signal setting assembly further comprises a pilot tone generator and a band pass filter centered about an expected second order output of the pilot tone generator, and wherein the output characteristic receive and command signal setting assembly is further configured to generate a drive command signal corresponding to a minimum output signal of the band pass filter.

10. The MR system of claim 9, wherein the pilot tone generator is configured to provide a pilot tone to the modulatable device.

11. The MR system of claim 9, wherein the pilot tone is generated during a pre-scan mode of a magnetic resonance system.

12. The MR system of claim 9, wherein the pilot tone is generated during a scan mode of the magnetic resonance system.

13. A method of remote control for a modulatable device comprising:
- remotely obtaining an output characteristic of the modulatable device, wherein the receiver system is located remotely with respect to the modulatable device;
- using the output characteristic to generate a drive command signal; and
- locally obtaining the drive command signal and setting a bias point of the modulatable device based on the drive command signal;
- wherein the output characteristic comprises an output power, and the drive command signal is generated based on a maximum output power and a minimum output power generated by the modulatable device.

14. The method of claim 13, wherein the locally obtaining is via an optical conduit.

15. The method of claim 14, wherein the drive command signal is generated by mapping a transfer function and obtaining an optical position for the drive command signal.

16. The method of claim 15 wherein the modulatable device comprises an optical modulator.

17. The method of claim 13, wherein the drive command signal is generated by taking an average of a first drive signal corresponding to the maximum output power and a second drive signal corresponding to the minimum output power.

18. The method of claim 14, wherein the drive command signal is generated based on output characteristic signal distortion.

19. The method of claim 14, wherein the modulatable device is adapted for use in a magnetic resonance system.

20. The method of claim 19, wherein the drive command signal is generated using a pilot tone.

21. The method of claim 20, wherein the pilot tone is generated during a pre-scan mode of a magnetic resonance system.

22. The method of claim 20, wherein the pilot tone is generated during a scan mode of the magnetic resonance system.

23. A magnetic resonance (MR) system including a remote control system for a modulatable device, the magnetic resonance system comprising:
- a modulatable device located within a magnetic field of the magnetic resonance system and configured to provide an output characteristic of the modulatable device to an output characteristic receive and command signal setting assembly situated outside the magnetic field;
- a bias system optically coupled to the output characteristic receive and command signal setting assembly and coupled to the modulatable device, the bias system configured to receive a drive command signal from the output characteristic receive and command signal setting assembly and to set a bias point of the modulatable device based on the drive command signal;
- wherein the output characteristic receive and command signal setting assembly is configured to generate the drive command signal by taking an average of a first drive signal corresponding to a maximum output power generated by the modulatable device and a second drive signal corresponding to a minimum output power generated by the modulatable device.

24. A magnetic resonance (MR) system including a remote control system for a modulatable device, the magnetic resonance system comprising:
- a modulatable device located within a magnetic field of the magnetic resonance system and configured to provide an output characteristic of the modulatable device to an output characteristic receive and command signal setting assembly situated outside the magnetic field;
- a bias system optically coupled to the output characteristic receive and command signal setting assembly and coupled to the modulatable device, the bias system configured to receive a drive command signal from the output characteristic receive and command signal setting assembly and to set a bias point of the modulatable device based on the drive command signal;
- wherein the command signal setting system further comprises a pilot tone generator and a band pass filter centered about an expected second order output of the pilot tone generator, and wherein the command signal setting system is further configured to generate a drive command signal corresponding to a minimum output signal of the band pass filter.

* * * * *